May 17, 1949.　　　　　S. A. MOORE　　　　　2,470,512
ELECTRICAL OUTLET BOX ATTACHING TOOL
Filed June 13, 1947
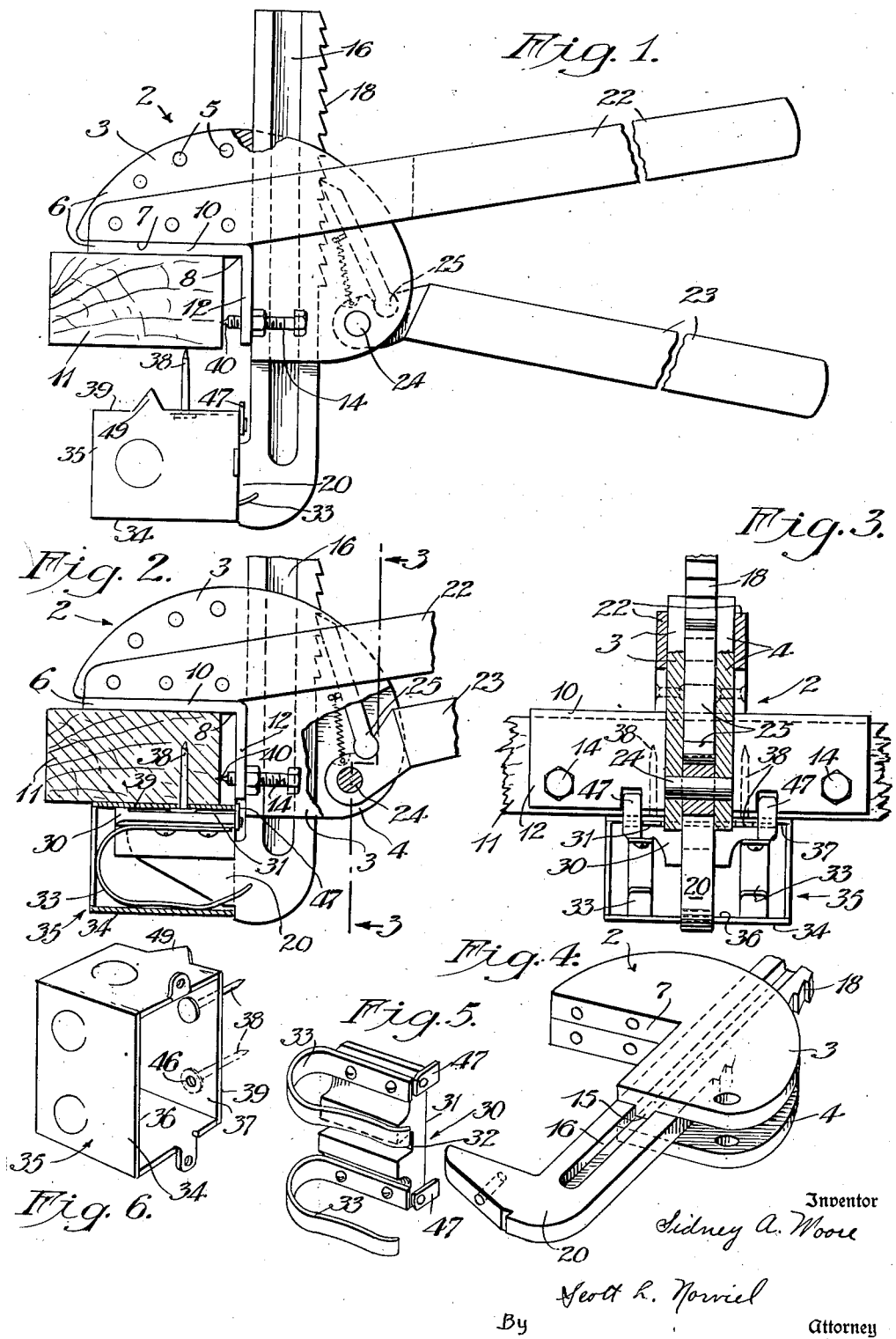
Inventor
Sidney A. Moore
Scott L. Norvell
By　　　　　　　　　　　Attorney Patented May 17, 1949

2,470,512

UNITED STATES PATENT OFFICE 2,470,512

ELECTRICAL OUTLET BOX ATTACHING TOOL

Sidney A. Moore, Phoenix, Ariz.

Application June 13, 1947, Serial No. 754,492

6 Claims. (Cl. 1—47)

This invention pertains to electrical outlet box attaching tools.

As is well known in the art, electrical outlet boxes are of two general types, solid and sectional. Heretofore, solid boxes could only be secured to wall frame members by building headers between the frames and fastening by screws driven through the back of the box. Sectional boxes could be mounted, securely, only by opening the box, which is usually done by taking out a screw and removing the side of the box, and nailing through holes in the other side of the box directly to the wall frame members. Both of these methods are slow and inefficient.

The primary object of the invention is to provide a tool to speed up the operation of setting outlet boxes of all types. It further has for its objects:

First, the provision of a hand operated tool adapted to hold an electrical outlet or switch box while it is positioned for attachment on a wall structure, and then fasten it to said wall structure by forcing it, together with nails or tabs, into elements of the wall structure;

Second, the provision of a tool having a pair of compression jaws adapted to be drawn together by mechanical means, one of said jaws being designed to be positioned on a stud member of a wall frame and the other being provided with an outlet box holding jaw and a forcing plate and means for attaching and retaining an electrical outlet box thereon in a predetermined position;

Third, the provision of a tool for attaching electrical outlet boxes to stud members of a wall frame; the tool comprising a frame fitted with a handle and a positioning jaw to enable it to be set and retained on a wall stud at a desired vertical position and at a predetermined depth, and a movable jaw having means to retain an electrical outlet box thereon, supported in said frame in slidable relation to said frame jaw, and ratchet mechanism operable by a handle adapted to force said movable jaw toward said frame jaw.

Other objects will appear hereinafter.

I attain the foregoing objects by means of the device illustrated in the accompanying drawings, in which Figure 1 is a plan view of the whole device with an outlet box carried on the movable box holding jaw of the device and in position to be applied to a wall frame member;

Figures 2, a similar plan view, but with the box holding jaw forced toward the positioning jaw and the parts moved to closed position with the outlet box attached to the wall frame member;

Figure 3, a front elevational view with the handle portions sectioned off along line 3—3, Figure 2, to show interior construction;

Figure 4, a perspective view of the frame of the tool, with the box holding jaw removed;

Figure 5, a perspective view of the movable jaw, box holding plate, in expanded relation to the sliding ratchet member shown in Figure 4 on which it attaches; and Figure 6 a perspective view of one form of electrical outlet box, of the type commonly used in house wiring to provide a fireproof shell and base for wall plugs, switches and the like, shown in offset expanded relation to the movable box holding jaw, Figure 5.

Similar numerals refer to similar parts in the several views.

This tool has a plate shaped body or frame 2 formed of plates 3 and 4 joined by bolts or rivets 5.

A stationary positioning jaw 6, made of an angle piece, is set in a notch 7 on the front of this frame with its apex 8 at right angles to the upper and lower faces of the frame.

The outer flange 10 of this angle piece forms a compression plate and is adapted to fit against the side of a wall frame member 11 when the flange 12 of the angle piece is pressed against the outer face of such wall member. The flange 12 forms a positioning plate and is provided with transverse screws 14 acting as positioning stops for determining the "set out" of the box from the wall member. The inner tips of these screws are flattened except for a central tip 40 which is sharpened so that each screw will engage into member 11 when pressed against it.

A slideway 15 is formed between frame plates 3 and 4, extends at right angles to the compression plate 10, and is shaped to receive slide 16 of movable jaw 20. This slide 16 has ratchet teeth 18 along its outer edge, opening and inclined toward jaw 20.

A holding and positioning handle 22 extends outward and rearward from frame body 2, and a movable handle 23 is operable to and from this positioning handle on a pivot bearing 24. Handle 23 carries a pivoted pawl 25 which is positioned to engage teeth 18 on slide 16. This motion of handle 23 toward handle 22 moves slide 16 and jaw 20 toward jaw 6.

On jaw 20 there is a box holding pressure plate 30 having an inner face 31 adjacent the inner face of stationary jaw compression plate 10. On the opposite side of plate 30 a slot 32 is cut to fit on jaw 20 and aid in attaching it. On each side of this slot are leaf springs 33, looped back and curved to press against the inner face 36 of the outer wall 34 of outlet box 35. The pressure of these springs draws the opposite face 37 of inner wall 39 against face 31 of plate 30 and resiliently secures the box thereon and holds nails 38 in place.

In use, box 35 is placed on movable jaw 20 by slipping it over plate 30 and springs 33 until the inner edge of box side 39 abuts depth stops 47. Nails 38 are placed in holes 46 in the box side prior to this operation and are held in place by reason of their heads being compressed against face 31 of plate 30. The tool, held by handle 32, is then pressed against and temporarily positioned on a wall frame member 11, with the sharpened tips 40 of depth positioning and depth gauging screws 14 set into the material of member 11.

Handle 23 is then worked back and forth toward handle 22 so that pawl 25 forces movable jaw 20, plate 30 and box 35, toward compression plate 10. This forces nails 38 into the member 11 and secures the box 35 to the wall member. The box may also be provided with sharpened tabs 49 which aid in securing it in place and preventing wobble. These tabs, if used, are set into wall frame member 11 during the same operation that sets the nails.

Thus the operation of setting these outlet boxes in walls becomes the matter of seconds rather than minutes. The device operates with solid boxes as well as sectional boxes, and the overall efficiency of installing electrical wiring in dwelling structures is greatly simplified and speeded.

While I have shown but one form and example of my device, it is to be understood that it may be made in various forms and sizes and with many equivalent mechanical substitutes of parts. In view of this it is intended that the following claims be liberally construed.

I claim:

1. A tool for attaching outlet boxes to wall frame members comprising a plate-shaped body having a jaw thereon with a pressure plate thereon, a location and depth gauging plate in right angular relation thereto, a movable jaw having a box holding pressure plate with spring elements adapted to retain an outlet box thereon, and a slide operating in said frame so as to move said box toward said pressure plate on said body jaw in parallel relation therewith and means for forcing said movable jaw and box holding pressure plate toward said pressure plate on said frame jaw including a hand lever on said body, having a pawl, and a ratchet operated thereby on said movable jaw slide.

2. A hand tool for attaching outlet boxes to frame wall members including, in combination, a plate-shaped body having a jaw means adapted to position said body on a wall frame member including a compression plate thereon, a positioning plate at right angles thereto having depth gauging screws transversely operative therethrough, a movable jaw slideway, a positioning handle, and a pivotally mounted handle provided with a pawl; a movable jaw having a slide operative in said slideway provided with ratchet teeth cooperative with said pawl, a box holding compression plate adapted to engage against an inner side of an outlet box provided with nails extending therethrough, leaf springs attached to said plate adapted to bear against the inside of an outlet box so that it is retained on said compression plate, and edge stops to determine the depth of said box on said compression plate.

3. A hand tool for attaching electrical outlet boxes to frame wall members including, a body frame in the form of a plate, a stationary positioning jaw thereon composed of an angle member attached to a notch in the front edge thereof with its apex at right angles to the faces of said plate, one flange of said angle member extending outward to act as a compression plate, and the other flange extending transversely and being provided with depth engaging screws, a slideway formed through said body at right angles to said compression plate, an outwardly extending positioning handle extending outward from said body and alined with said compression plate, and a pivotally mounted handle operative to and from said positioning handle having a pawl; in combination with a movable jaw having a slide operable in said body slideway, ratchet teeth cooperative with said pawl, and a box holding compression plate at right angles to said slide and disposed in parallel relation to said stationary compression plate adapted for insertion into an outlet box, provided with springs for retaining an outlet box thereon, and stops to engage the outer rim of said outlet box.

4. A tool for attaching outlet boxes to wall frame members comprising a plate-shaped body having upper and lower faces, a positioning handle extending outward therefrom, a notch formed on the inner portion of said body, and a transverse slideway therethrough, an angle piece forming a pressure plate and a right angularly disposed depth gaging plate set in said notch with the angle apex of said piece at right angles to the faces of said body, said pressure plate facing transversely relative to said body, a movable jaw having a slide operative in said body slideway and a box holding pressure plate thereon facing the pressure plate on said body, spring means for resiliently retaining an outlet box on said box holding pressure plate, and means for forcing said box holding pressure plate toward said pressure plate on said body, including a movable handle pivoted on said body to swing toward and from said positioning handle, a pawl thereon, and a ratchet on said slide cooperative with said pawl.

5. A tool for attaching electrical outlet boxes to frame wall members, including, a plate-shaped body, a stationary compression plate on the forward portion thereof and extending outward therefrom, a positioning jaw extending transversely from said compression plate having depth gauging pointed screws operative therethrough, said plate and said screws being adapted to engage over the edge of a frame wall stud, a transverse slideway formed through said body, and a positioning handle extending outward from the rear portion of said body, in combination with a movable jaw having a slide operative in said body slideway and a box holding compression plate having its front face facing said stationary compression plate, means for resiliently retaining an outlet box thereon with nails extending outward therefrom in the direction of said stationary compression plate, including C-shaped leaf springs attached to the back of said compression plate and adapted to bear on the side of an outlet box placed thereon to urge the opposite box side against the front face of said compression plate, and means for forcing said box holding plate toward said stationary plate including a handle pivoted on said body to swing to and from said positioning handle, a pawl thereon and a ratchet on the outer portion of said movable jaw slide cooperative with said pawl.

6. A hand tool for attaching outlet boxes to wall frame members including, a plate-shaped body having a jaw, means adapted to position said body on a wall frame member, including a compression plate thereon, and a positioning plate at right angles thereto having depth gaging screws, a movable jaw slideway, a positioning handle, and a pivotally mounted handle provided with a pawl; a movable jaw having a slide operative in said slideway provided with ratchet teeth cooperative with said pawl, a box holding compression plate adapted to engage against heads of nails set in and extending outward from the side of an outlet box positioned thereon, so that said nails will be forced into a wall frame member when said box holding plate is forced toward said pressure plate on said body, positioned against said wall frame member, leaf springs attached to said pressure plate and adapted to bear against the inside face of the side of said outlet box opposite the side thereof carrying said nails, so that said outlet box with said nails extending outward therefrom is retained on said compression plate.

SIDNEY A. MOORE.

REFERENCES CITED

The following references are of record in the file of this patent:

UNITED STATES PATENTS

| Number | Name | Date |
| --- | --- | --- |
| 956,128 | Mimmack | Apr. 26, 1910 |

FOREIGN PATENTS

| Number | Country | Date |
| --- | --- | --- |
| 450,845 | France | Jan. 29, 1913 |